(12) United States Patent  
Foster et al.

(10) Patent No.: US 8,486,266 B1  
(45) Date of Patent: Jul. 16, 2013

(54) BACTERIAL CULTIVATION SYSTEM FOR GROWTH OF SUBSTRATE SPECIFIC MICRO-ORGANISMS FOR USE IN INDUSTRIAL WASTEWATER REMEDIATION

(71) Applicant: Environmental Business Specialists, LLC, Mandeville, LA (US)

(72) Inventors: Michael Harvey Foster, Mandeville, LA (US); Kenneth Wayne Smith, Natchez, MS (US); Bronwyn Duos, Hammond, LA (US); Elizabeth Claire Guidotti, Mandeville, LA (US)

(73) Assignee: Environmental Business Specialists, LLC, Mandeville, LA (US)

( * ) Notice: Subject to any disclaimer, the term of this patent is extended or adjusted under 35 U.S.C. 154(b) by 0 days.

(21) Appl. No.: 13/646,150

(22) Filed: Oct. 5, 2012

Related U.S. Application Data

(63) Continuation of application No. 13/291,831, filed on Nov. 8, 2011, now Pat. No. 8,282,826, which is a continuation of application No. 12/261,883, filed on Oct. 30, 2008, now Pat. No. 8,052,873.

(60) Provisional application No. 60/984,228, filed on Oct. 31, 2007.

(51) Int. Cl.  
*C02F 3/00* (2006.01)

(52) U.S. Cl.  
USPC .......................... 210/610; 210/611; 210/621

(58) Field of Classification Search  
USPC ......................... 210/610–611, 621  
See application file for complete search history.

(56) References Cited

U.S. PATENT DOCUMENTS

| | | | |
|---|---|---|---|
| 4,267,112 | A | 5/1981 | Reusser et al. |
| 4,623,464 | A | 11/1986 | Ying et al. |
| 5,531,898 | A | 7/1996 | Wickham |
| 6,346,412 | B1 | 2/2002 | Stormo |
| 6,416,993 | B1 | 7/2002 | Wexler et al. |
| 6,488,852 | B2 | 12/2002 | Lucido et al. |
| 6,649,397 | B1 | 11/2003 | Nakamura |
| 6,673,582 | B2 | 1/2004 | McTavish |
| 6,783,677 | B1 | 8/2004 | Irani |

(Continued)

OTHER PUBLICATIONS

Oxygen Solubilities in Fresh Water downloaded from http://www.engineeringtoolbox.com/oxygen-solubility-water-d_841.html on Sep. 29, 2010.

*Primary Examiner* — Chester Barry  
(74) *Attorney, Agent, or Firm* — Garvey, Smith, Nehrbass & North, L.L.C.; Charles C. Garvey, Jr.; Vanessa M. D'Souza

(57) ABSTRACT

A waste treatment method includes the concentration of selected strains of bacteria in a selected medium in the presence of nutrients and water, under aerobic conditions. This concentrated batch is discharged for downstream applications in wastewater remediation. A cultivation chamber having inlet ports and a circular vent port allows for adequate air introduction and heat release. Aeration is achieved by recirculation of the fluid medium from the top of the apparatus through a pipe that runs the length of the inner wall and is specially configured at the top to minimize cell damage. Fluid can be routed tangentially in clockwise and counterclockwise directions. The conical bottom has an orifice allowing for recirculation of the fluid medium tangentially to the sidewalls. Upon completion of batch cultivation, the medium and bacteria are discharged for downstream applications in wastewater remediation of paper mill, chemical plant, oil refinery, and other industrial effluents.

24 Claims, 19 Drawing Sheets

U.S. PATENT DOCUMENTS

| | | |
|---|---|---|
| 6,811,701 B2 | 11/2004 | Wilkie |
| 7,022,234 B2 * | 4/2006 | Shaffer et al. ................. 210/610 |
| 8,052,873 B1 | 11/2011 | Foster et al. |
| 8,282,826 B1 | 10/2012 | Foster et al. |
| 2003/0109028 A1 | 6/2003 | Constans |
| 2003/0215934 A1 | 11/2003 | Rothweiler |
| 2004/0077847 A1 * | 4/2004 | Briles et al. .................. 536/23.1 |
| 2005/0208642 A1 | 9/2005 | Hoshina et al. |
| 2006/0286006 A1 | 12/2006 | McDaniel et al. |
| 2006/0286658 A1 | 12/2006 | Felder et al. |

* cited by examiner

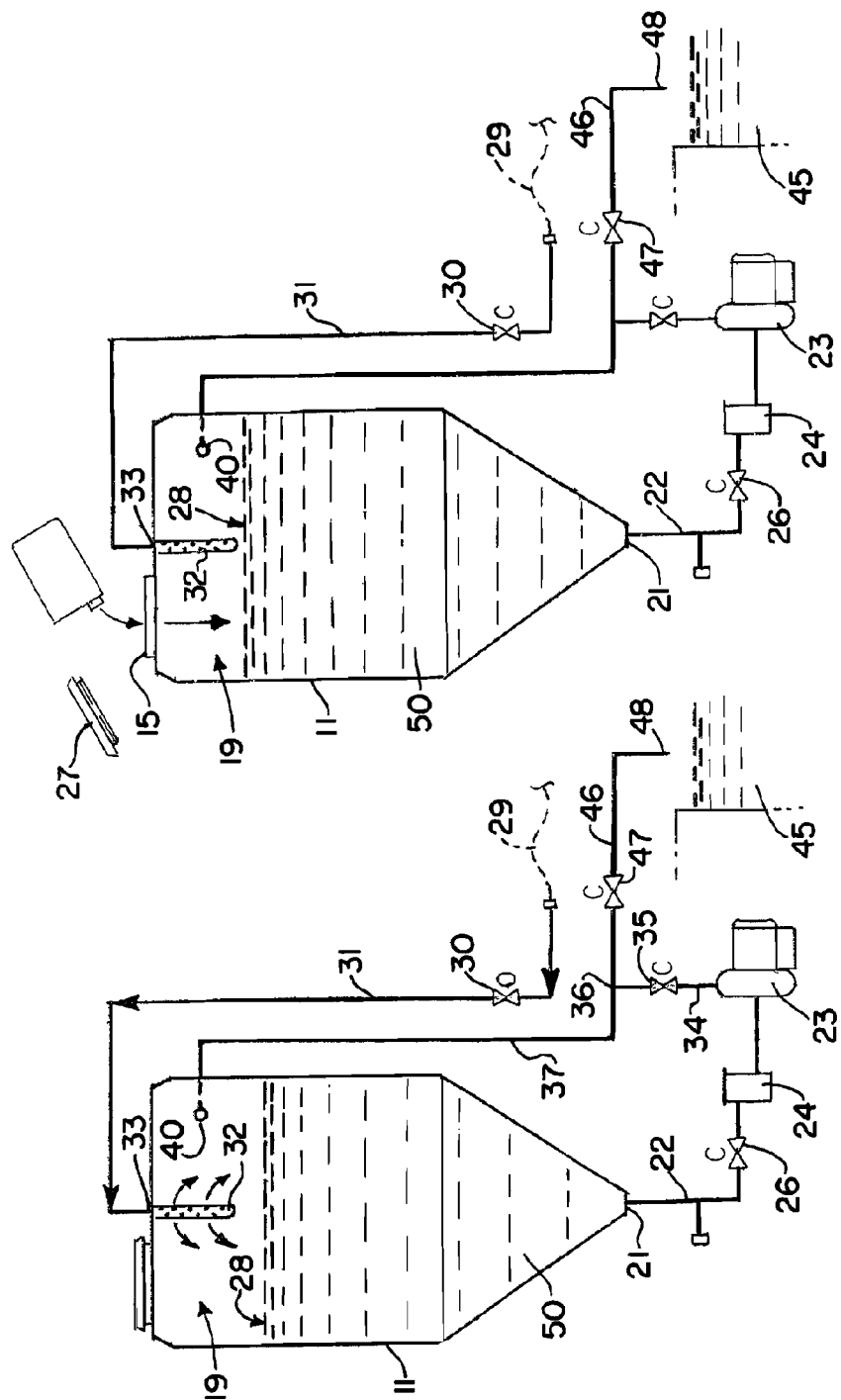

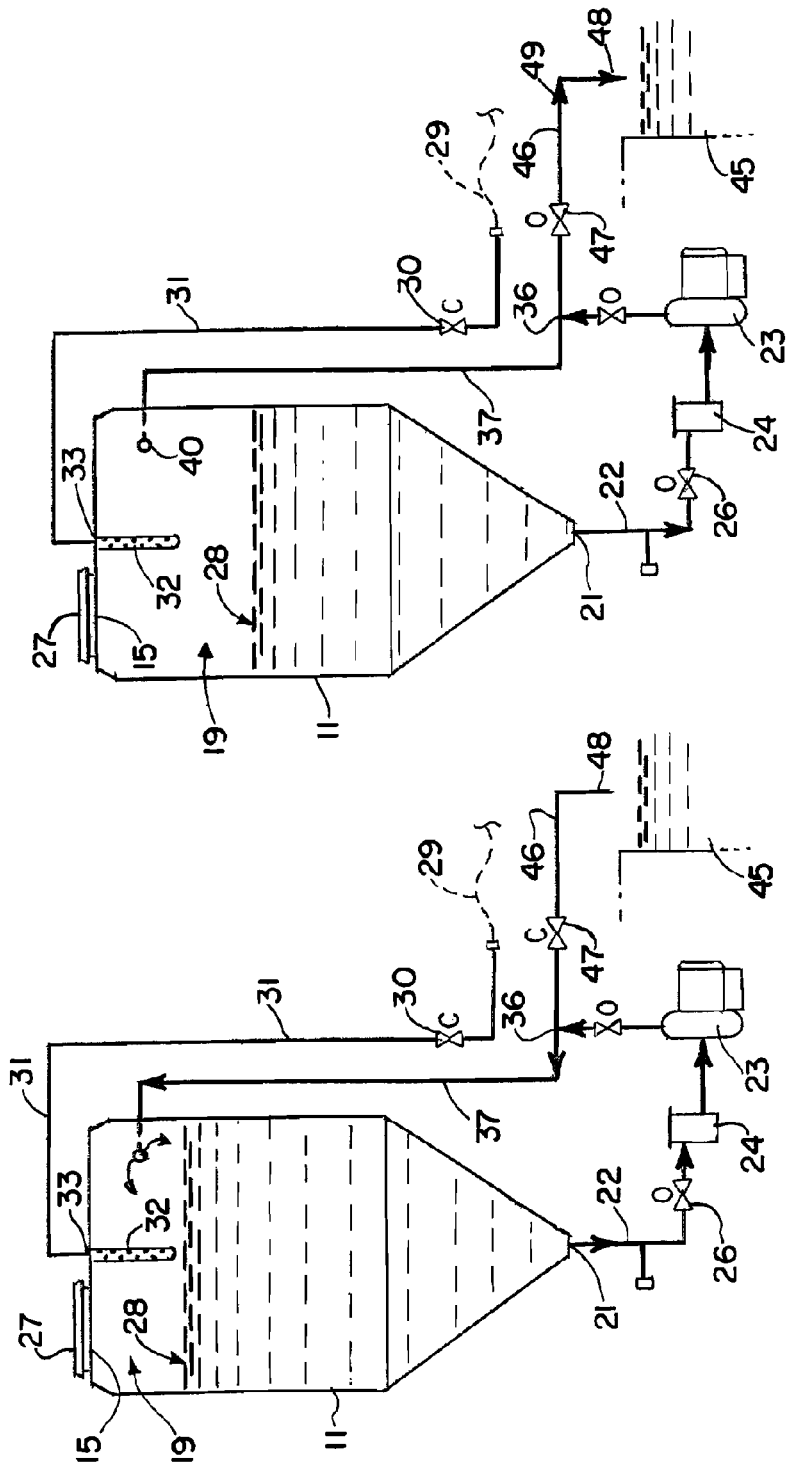

Percent Soluble COD Removed

BACTERIAL CULTIVATION SYSTEM FOR GROWTH OF SUBSTRATE SPECIFIC MICRO-ORGANISMS FOR USE IN INDUSTRIAL WASTEWATER REMEDIATION

CROSS-REFERENCE TO RELATED APPLICATIONS

This is a continuation of U.S. patent application Ser. No. 13/291,831, filed Nov. 8, 2011 (issuing as U.S. Pat. No. 8,282,826 on Oct. 9, 2012), which is a continuation of U.S. patent application Ser. No. 12/261,883, filed Oct. 30, 2008 (now U.S. Pat. No. 8,052,873, issued on Nov. 8, 2011), which is a nonprovisional of U.S. Provisional Patent Application Ser. No. 60/984,228, Oct. 31, 2007, each of which are hereby incorporated herein by reference.

Priority of U.S. Provisional Patent Application Ser. No. 60/984,228, filed Oct. 31, 2007, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates generally to bioremediation and to an improved method and apparatus for bacterial cultivation, preferably for growth of substrate specific micro-organisms that are then used in industrial wastewater remediation. More particularly, the present invention relates to an improved method and apparatus for cultivating strains of bacteria in various medium (e.g. nutrients and water), under aerobic conditions and thereafter discharging the combination of concentrated bacteria and medium downstream to a reservoir that contains wastewater to be treated. The aeration and circulation of fluids is designed to limit cells shearing and damage yet achieve critical cell mass (between about $1 \times 10^7$ and $1 \times 10^{12}$ cfu (colony forming units) per milliliter and dissolved oxygen levels during cultivation. Critical cell mass is the minimum number of bacterial cells per milliliter required to achieve effective bioremediation.

2. General Background of the Invention

The remediation of industrial wastewater has in the past employed various bacteria. One application where this desired remediation is particularly useful is in the pulp and paper industry. The pulp and paper industry in the United States is one of the largest fully integrated industries in the world. Each year, mills in every part of the country produce millions of tons of paper and paper products for domestic and foreign use. The Environmental Protection Agency estimates the total value of shipments from the pulp and paper industry as close to $135 billion, as much as the petroleum refining industry.

Pulp and paper manufacturing involves a series of steps, each producing one or more characteristic wastes. A typical pulp and paper mill discharges from 25,000 to over 100,000 liters of wastewater for each air-dried ton of pulp produced. While the wastewater is discharged into the environment only after it has received on-site treatment, it still contains contaminant substances and residual organic solids. Mills discharging liquid waste into rivers and coastal waters are required, pursuant to the Waste Management Act, to obtain site-specific effluent discharge permits. Because of the potential for fines and the possibility of temporary or permanent closure, maintenance of the wastewater treatment is of great importance to owners and operators within the industry. The following tables summarize the typical processes and associated contaminants with paper manufacturing.

TABLE 1

Typical Paper Industry Operations: Materials Used and Hazardous Wastes that Might be Generated

| Process/Operation | Materials Used | General Types of Waste Generated |
| --- | --- | --- |
| Chemical Pulping | Acids/alkalies, lime, sulfurous acid, sodium hydroxide, sodium sulfide | Acid/alkaline waste |
| Bleaching | Chlorine bleaches, sulfate bleaches, chloroform, solvents | Toxic wastewater and wastewater treatment sludge, Acid/alkaline waste |
| Papermaking | Pigments | Wastewater treatment sludge |
| Sizing and Starching | Waxes, glues, synthetic resins, hydrocarbons | Toxic waste, including wastewaters and sludges |
| Coating, Coloring, and Dyeing | Inks, paints, solvents rubbers, dyes | Solvent waste, ink waste, paint waste, ignitable waste, toxic waste |
| Cleaning and Degreasing | Tetrachloroethylene, Trichloroethylene, methylene chloride, trichloroethane, carbon tetrachloride | Solvent waste, toxic rinse water |

TABLE 2

Paper Industry Waste Descriptions

| Waste Type | Designations/Trade Names |
| --- | --- |
| Spent Solvents | Other Toxic or Ignitable Wastes |
| Carbon Tetrachloride | Carbon Tetrachloride, Carbon Tet, Tetrachloromethane |
| Methylene Chloride | Methylene Chloride, Dichloromethane |
| Tetrachloroethylene | Tetrachloroethylene, Perchloroethylene, PCE |
| 1,1,1-Trichloroethane | 1,1,1-Trichloroethane, 1,1,1-TCA |
| Trichloroethylene | Trichloroethylene, TCE |
| Chloroform | Chloroform |
| Benzene | |
| Ethylene Dichloride | Ethylene Dichloride, 1,2-Dichloroethane |
| Chlorobenzene | Chlorobenzene, Monmhlombenzene, Phenyl Chloride |
| Methyl Ethyl Ketone- | Methyl Ethyl Ketone, Methyl Acetone, Meetco, But@one, Ethyl Methyl Ketone, MEK, 2-Benzene |
| Mixed Spent Petroleum Distillates | Halogenated Solvents Petroleum Distillates |

| Waste Type | Hazard Clan | UN/NAID Number |
| --- | --- | --- |
| Waste Carbon Tetrachloride | ORM-A | UN1846 |
| Waste Dichloromethane | ORM-A | UN1593 |
| Waste Tetrachloroethylene | ORM-A | UN1897 |

TABLE 2-continued

Paper Industry Waste Descriptions

| | | |
|---|---|---|
| Waste 1,1,1-Trichloroethane | ORM-A | UN2831 |
| Waste Trichloroethylene | ORM-A | UN1710 |
| Waste Chloroform | ORM-A | UN1888 |
| Waste Benzene (Benzol) | Flammable Liquid 2 | UN1114 |
| Waste Ethylene Dichloride | Flammable Liquid | UN1184 |
| Waste Chlorobenzene | Flammable Liquid | UN1134 |
| Waste Methyl Ethyl Ketone | Flammable Liquid | UN1193 |
| Hazardous Waste: Liquid, NOS | ORM-E | NA9199 |
| Waste Petroleum Distillate | Flammable Liquid | UN1268 |
| | Combustible Liquid 4 | UN1268 |

| Designations | Trade Names |
|---|---|
| Corrosive Wastes | |
| Ammonium Hydroxide | Ammonium Hydroxide, Aqueous Ammonia, Ammonia Water, Spirit of Hartshorn |
| Hydrobromic Acid | Hydrobromic Acid |
| Hydrochloric Acid | Hydrochlonc Acid, Muriatic Acid |
| Hydrofluoric Acid | Hydrofluoric Acid |
| Nitric Acid | Nitric Acid, Aquafortis |
| Phosphoric Acid | Phosphoric Acid, Orthophosphoric Acid |
| Potassium Hydroxide | Potassium Hydroxide, Caustic Potash |
| Sodium Hydroxide | Sodium Hydroxide |
| Sulfuric Acid | Sulfuric Acid, Oil of Vitriol |
| Other Wastes and Paint Waste with Heavy metals | General Classifications Corrosive Liquid; Corrosive Solid; Ignitable Wastes, NOS; Hazardous Wastes, NOS |
| Paint Waste with Heavy Metals | Corrosive Liquids; Corrosive Solids; Ignitable Wastes, NOS |

Within the industry, bacteria and their enzymes, along with some fungi and critical nutrient additives, have proven to be effective agents for in-situ remediation of organic wastes and subsurface pollution in soils, sediments and wastewaters associated with these processes. Effective management of a microbiological population can provide both short-term or long-term effluent improvements meeting tightening environmental restrictions, while minimizing capital expenses.

Environmental professionals are expected to "do more with less" by squeezing every ounce of performance out of the wastewater treatment system. In some cases, the quality or quantity of influent to the system has changed so much that the treatment system's design is no longer adequate to achieve the desired results. In other cases, the treatment system's capabilities have deteriorated while effluent requirements have become more stringent. In either case, innovative approaches may be necessary to allow the mill to simultaneously meet its environmental requirements, while also realizing its financial goals. Traditional waste treatment control strategies have focused on monitoring and controlling system parameters. Bioaugmentation involves applying biological additives to enhance the performance of secondary or biological wastewater treatment systems, focusing on managing the bacterial population (i.e. the work force) of the system.

In order to optimize the performance of the microbiological population, a comprehensive approach must be used to manage the system. Understanding how mill upsets and operational problems affect the microbiological population is critical to optimizing the wastewater treatment plant. Bioaugmentation has been practiced since the early 1960s. Given a history that includes misapplication of additives and poor documentation of results, the technology has come to be regarded as less than scientific in some circles. In many cases, rather than actively managing the treatment system through bioaugmentation, mills have adopted the widespread belief that over time, the proper microbes will populate the system and become acclimated to its influent. This belief assumes that the indigenous population, which is introduced via routes such as windblown solids, rainwater, and the plant influent stream, will always contain the organisms that are best suited for the service. In reality, even though the natural population may develop into an acceptable one, there may be performance limitations that only can be overcome by the introduction of additional microorganisms.

BRIEF SUMMARY OF THE INVENTION

A waste treatment method includes the concentration of selected strains of bacteria in a selected medium in the presence of nutrients and water under aerobic conditions. This concentrated batch is thereafter discharged for downstream applications in wastewater remediation. The present invention employs a cultivation chamber having inlet ports and a circular vent port that allows for adequate air introduction and heat release.

Aeration is achieved by recirculation of the fluid medium from the top of the apparatus through a pipe that runs the length of the inner wall and is specially configured at the top to minimize cell damage. Fluid can be routed tangentially in both the clockwise and counterclockwise directions within the chamber. The conical bottom also has an orifice allowing for recirculation of the fluid medium tangentially to the sidewalls. Upon completion of batch cultivation, the medium and bacteria are discharged for downstream applications in wastewater remediation of paper mill, chemical plant, oil refinery, and other industrial effluents. The aeration and circulation of the fluids is designed to limit cell shearing and damage yet achieve critical cell mass (above $10^7$, e.g. between about $10^7$ and $10^{11}$ per milliliter (ml)), more particularly between $10^8$ and $10^{10}$ per milliliter (ml). Omotoa; dissolved oxygen levels are probably e.g. between about 0.5 and 100 mg/L prior to cultivation. The amount of dissolved oxygen drops as the cells respire and divide. In the preferred embodiment the dissolved oxygen uptake rate (DOUR) is preferably above 10 mg/liter/hr, e.g. between about 50 and 1500 mg/liter/hr. Typically the DOUR will be between 10 mg/liter/hr and 450 mg/liter/hr during logarithmic growth.

The present invention includes a method of wastewater remediation of a volume of wastewater stored in a reservoir, comprising the steps of providing a vessel having an interior holding a volume of nutrient liquid medium, adding a volume of bacteria to the nutrient liquid medium, and repeating this step within 12-72 hours, providing a fluid transfer system that is in fluid communication with the vessel, the transfer system including an influent flow line, a pump and an effluent flow line, and repeating this step within 12-72 hours, for a first time interval, recirculating the combination of nutrient liquid medium and bacteria through a flow path that begins within the vessel interior and flows from the vessel via the effluent flow line to the pump, returning to the vessel interior via the influent flow line, during which first time interval the bacteria concentration increases to a concentration of between about 107 to 1010 cfu (colony forming units) per milliliter (ml), after the first time interval, transmitting a volume of the combination of nutrient liquid medium and bacteria to the reservoir, and repeating this step within 12-72 hours.

A waste treatment method includes the concentration of selected strains of bacteria in a selected medium in the presence of nutrients and water, under aerobic conditions. This concentrated batch is thereafter discharged for downstream applications in wastewater remediation. The present invention employs a cultivation chamber having inlet ports and a circular vent port that allows for adequate air introduction and heat release. Aeration is achieved by recirculation of the fluid medium from the top of the apparatus through a pipe that runs the length of the inner wall and is specially configured at the top to minimize cell damage. Fluid can be routed tangentially in both the clockwise and counterclockwise directions within the chamber. The conical bottom also has an orifice allowing for recirculation of the fluid medium tangentially to the sidewalls. Upon completion of the batch cultivation, the medium and bacteria are discharged for downstream applications in wastewater remediation of paper mill, chemical plant, oil refinery, and other industrial effluents. The aeration and circulation of the fluids is designed to limit cells shearing and damage yet achieve critical cell mass (e.g. between $10^7$ and $10^{10}$ cfu (colony forming units) per milliliter (ml)) and dissolved oxygen uptake rates (e.g. between about 50 and 1500 mg/liter/hr) during cultivation.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 5 is a schematic diagram of the preferred embodiment of the apparatus of the present invention showing the addition of water to the growth chamber;

FIG. 6 is a schematic diagram of the preferred embodiment of the apparatus of the present invention showing the addition of a bacteria/medium to the growth chamber;

FIG. 7 is a schematic diagram of the preferred embodiment of the apparatus of the present invention illustrating the recirculation steps;

FIG. 8 is a schematic diagram of the preferred embodiment of the apparatus of the present invention illustrating a transmission of the recirculated bacteria, medium and water mixture to a reservoir of wastewater that is to be treated;

DETAILED DESCRIPTION OF THE INVENTION

The term "bioremediation" as used herein refers to any process of cleaning, removing, reducing, or decreasing an amount of a waste material, contaminant, pollutant, or environmentally unsafe component from matter by enhancement of a natural population of microorganisms or by adding developed microbial cultures.

The term B.O.D. as used herein refers to biochemical oxygen demand, which is a measurement of how much oxygen is needed from the environment.

Figures 1, 9:
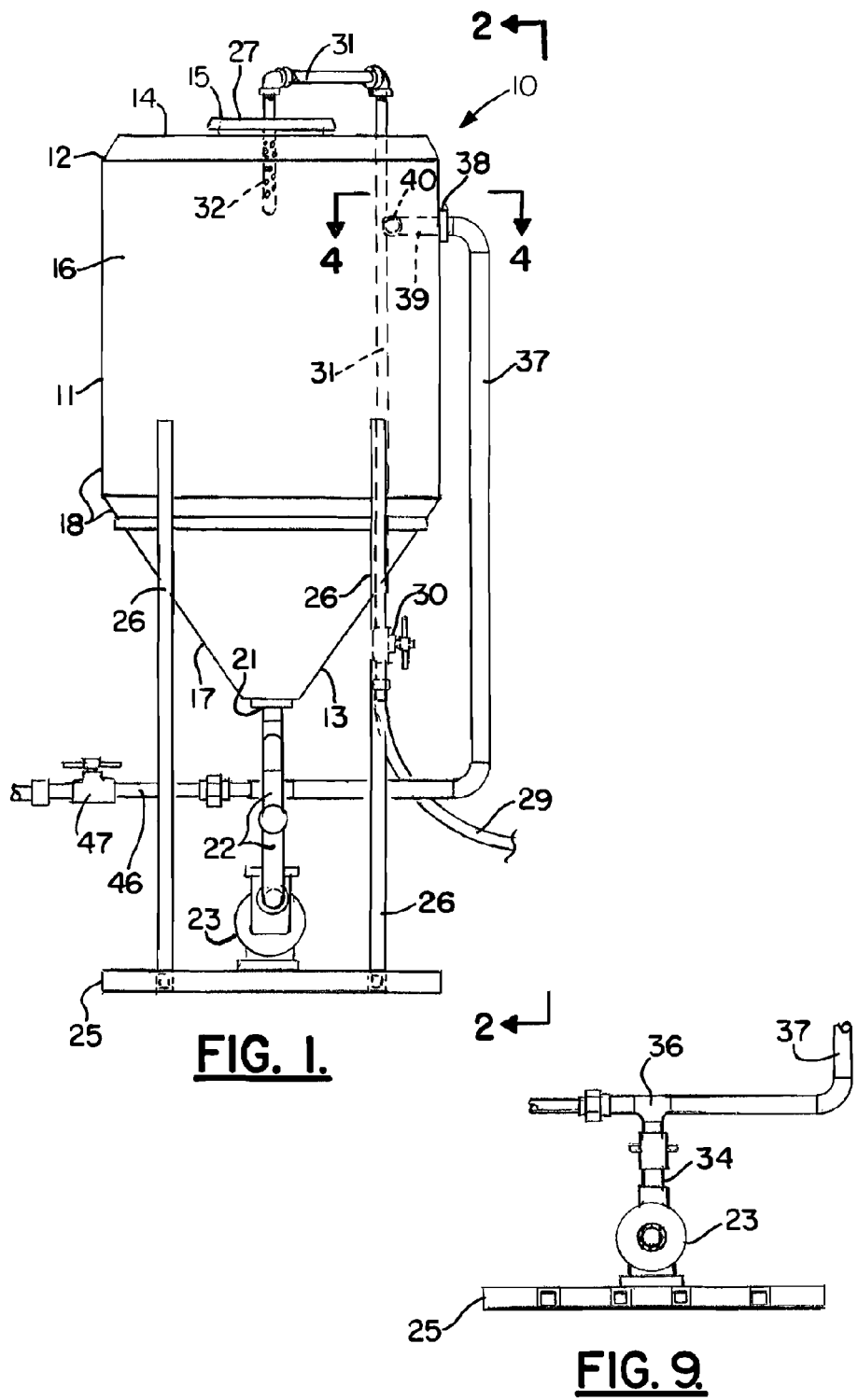
FIG. 1 is an elevation view of the preferred embodiment of the apparatus of the present invention.
FIG. 9 is a fragmentary view of the preferred embodiment of the apparatus of the present invention taken along lines 9-9 of FIG. 2.
Figure 2:
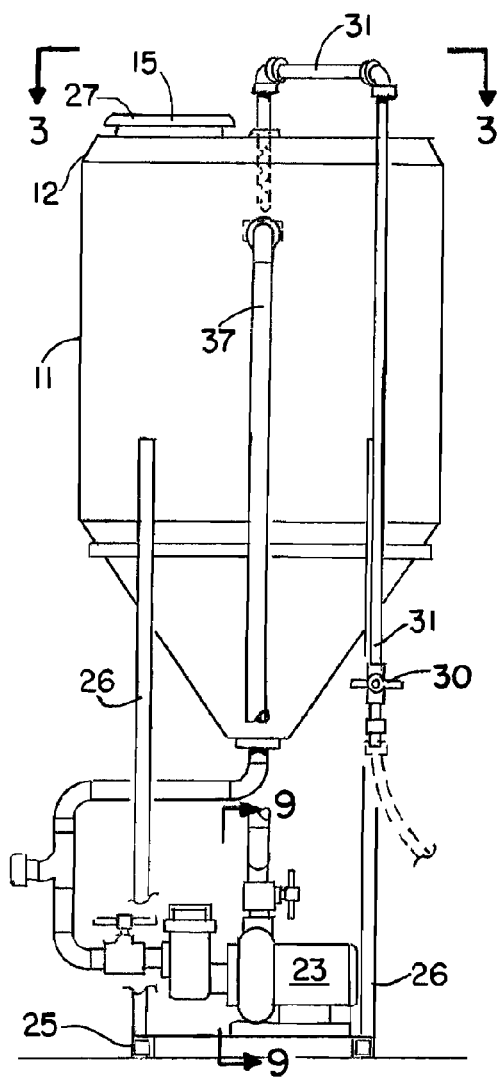
FIG. 2 is another elevation view of the preferred embodiment of the apparatus of the present invention.
Figure 3:
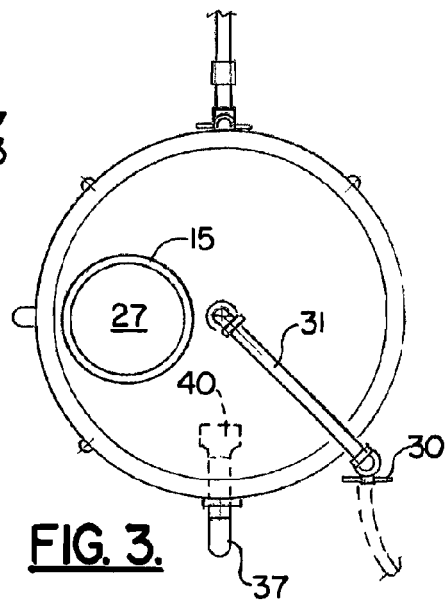
FIG. 3 is a top view of the preferred embodiment of the apparatus of the present invention, taken along lines 3-3 of FIG. 2.

FIGS. 1 and 2 show waste treatment apparatus 10 which includes a growth chamber 11 having an upper end portion 12 and a lower end portion 13. Upper end portion 12 of growth chamber 11 provides a top 14 having an opening 15 that can be fitted with cover 27. Growth chamber 11 can include a cylindrically shaped section 16 and a conically shaped section 17. The growth chamber 11 thus provides a sidewall 18 that has an inside surface 19 surrounding an interior 20 that contains water, bacteria and medium for feeding the bacteria.

Outlet port 21 communicates with discharge piping 22, which piping 22 communicates with pump 23. A filter 24 can be placed in discharge piping 22 in between outlet port 21 and pump 23. Base 25 can provide legs 26 that support growth chamber 11. Pump 23 can be attached (for example, bolted) to base 25. Flow line 31 is an influent flow line that enables water from water supply 29 to be added to the interior 20 of growth chamber 11. Flow line 31 can be provided with valve 30 for enabling a control of influent water. Flow line 31 attaches to growth chamber 11 at inlet opening 33. Inlet opening 33 can be provided with a discharge fitting 32 such as a perforated pipe that provides some aeration of water that is transmitted via flow line 31 to interior 20 of growth chamber 11. Water is added via flow line 31 to chamber 11 until the water reaches a selected fluid or water level 28.

Figure 4:
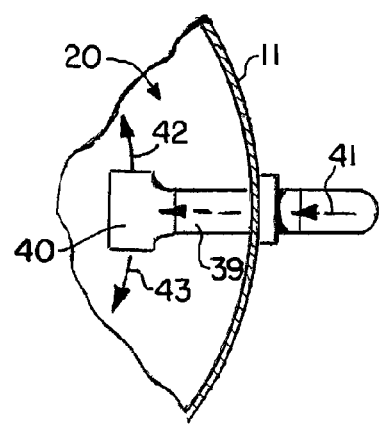
FIG. 4 is a top fragmentary view of the preferred embodiment of the apparatus of the present invention.

Pump discharge flow line 34 communicates between pump 23 and tee fitting 36. Flow rate in line 34 is typically between about 55 and 90 gallons per minute. The flow line 34 and tee 36 are connected to riser 37 and influent fitting 38. In FIGS. 1, 2 and 4, the influent fitting 38 connects via pipe section 39 to tee fitting 40. Arrows 41, 42, and 43 in FIG. 4 illustrate that recirculating fluid (a combination of water, medium and bacteria) exit tee fitting 40 in two directions as illustrated by arrows 42, 43. This action prevents any substantial vortex formation which might shear or damage the bacteria. Tee fitting 40 provides aeration and circulation of the fluid which includes bacteria, medium and water while limiting cell shearing and damage, yet at the same time achieving a critical cell mass and high dissolved oxygen level during cultivation.

The cultivation is performed by recirculating fluid using pump 23 via flow lines 34, 36 with return to pump 23 via outlet port 21 and discharge piping 22. This recirculation is preferably conducted for several hours (typically more than 4-6 hours, preferably between about 6 hours and 72 hours, more specifically between about 8 and 24 hours.

Figure 10:
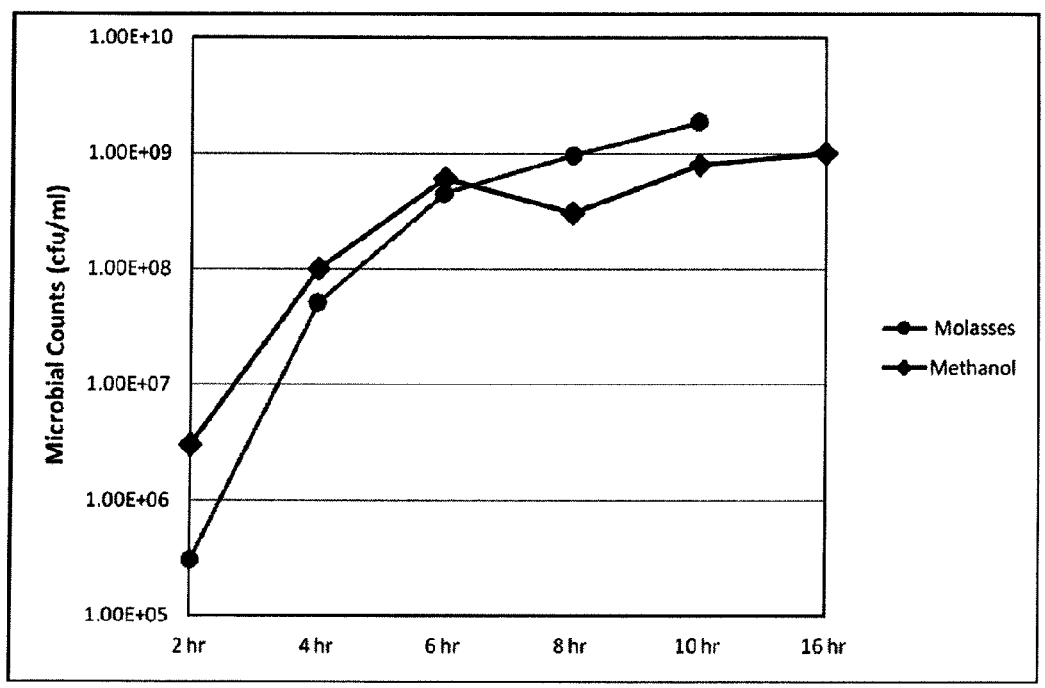
FIG. 10 is a graph indicating microbial counts over time in hours for the chamber part of the preferred embodiment of the apparatus of the present invention, wherein the chamber is filled with a nutrient blend that includes molasses in one example and a nutrient blend that includes methanol in another example.

During this time, the recirculation and aeration in combination with a growth medium produces exponential growth of bacteria within the interior 20 of growth chamber 11 (see Microbial Count in FIG. 10). After a selected time period, valve 47 is opened so that the combination of water, growth medium and bacteria can be discharged via flow line 46 to discharge 48 and into reservoir 45 in the direction of arrow 49 as shown in FIG. 8. This discharge can be via gravity flow through flow lines 22, 46. Alternatively, the mixture 50 of bacteria, water and medium can be transmitted to flow line 46 using pump 23, wherein valves 35, 47 are opened.

EXAMPLES

Example 1

In the first example shown in FIG. 10 (Molasses) the chamber 11 was filled with 85 gallons of water, 500 ml of pure molasses, 80 ml of a nutrient blend of nitrogen and phosphorus, commercially available from Environmental Business Specialists, Inc (www.ebsbiowizard.com), and 320 ml of LiquiStar EE (microbe blend including various strains of bacillius and commercially available from Environmental Business Specialists, Inc (www.ebsbiowizard.com)). In the second example shown in FIG. 10 (Methanol) the chamber 11 was filled with 85 gallons of water, 250 ml MEOH, 80 ml of a blend of nitrogen and phosphorus—commercially available from Environmental Business Specialists, Inc (www.ebsbiowizard.com) and 250 ml of MicroStar L1 (microbe blend including various strains of bacillus). In both cases critical cell mass was achieved before 24 hours. For the molasses experiment the maximum microbial count achieved using the IME kool kount autoanalyzer was $1.85 \times 10^9$ at the hour time point. For the methanol experiment, the maximum microbial count achieved at the 16 hour time point was $1 \times 10^9$. In both cases the logarithmic microbial growth achieved is more than adequate for downstream remediation of industrial wastes.

Example 2

Figure 11:
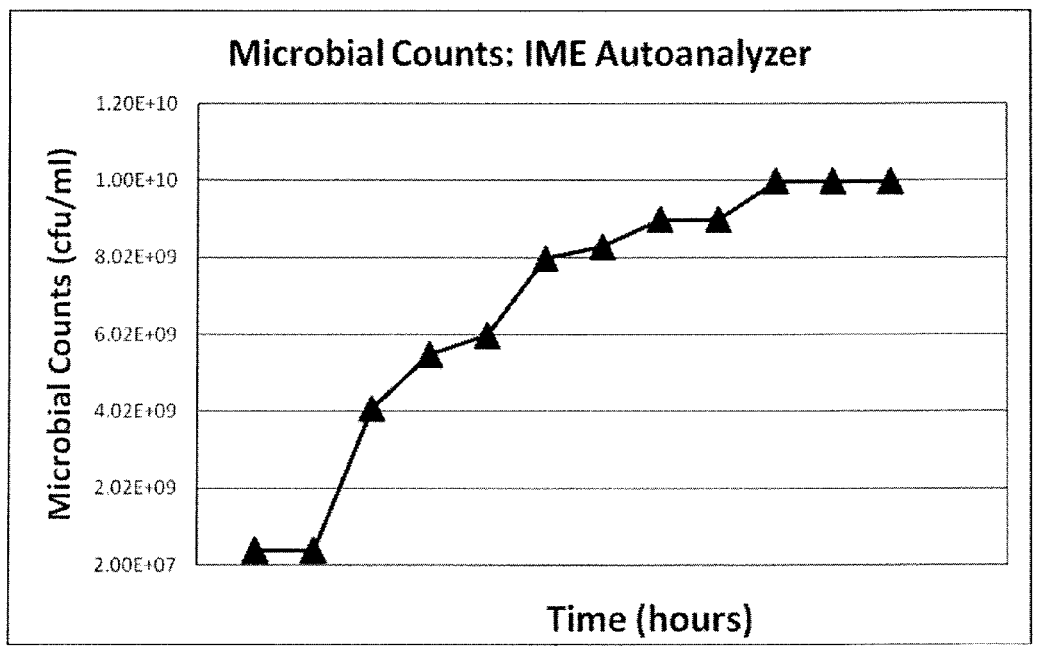
FIG. 11 is a graph indicating microbial counts over time in hours for the chamber part of the preferred embodiment of the apparatus of the present invention, wherein the chamber is filled with a blend of nutrients and bacteria and wherein the results were obtained using a commercially available autoanalyzer.

In the example shown in FIG. 11 the chamber 11 was filled with 5 lbs MicroStar (a blend of various strains of bacteria including bacillius and pseudomonas together in a dry blend (e.g. brewer's or distiller's grain as a carrier) commercially available from Environmental Business Specialists, Inc (www.ebsbiowizard.com)) and 85 gallons of water. These data are an average of various experiments conducted using the MicroStar microbial augmentation product. These counts were achieved using the commercially available IME kool kount autoanalyzer (www.imeinc.com). The test was ran at two hour increments beginning at time 2 hrs and ending at time 24 hrs. On average the 2 hr counts were approximately $2e^7$ at experiment initiation, with logarithmic growth beginning between about 4 and 5 hours and lasting to between about 24 and 26 hours. The average microbial count achieved using this product was between about $9e^9$ and $1e^{10}$. The average time to achieve this cell mass is between about 12 and 36 hours, more specifically 8 and 24 hours.

Example 3

Figure 12:
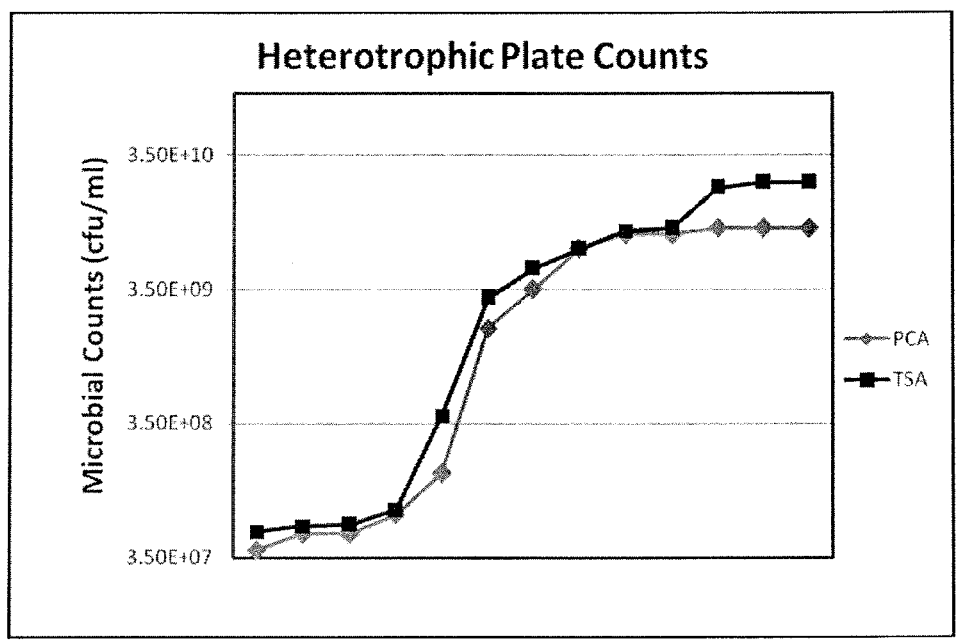
FIG. 12 is a graph indicating a test that was conducted to evaluate a commercially available autoanalyzer, comparing the data of FIG. 11 with the data of FIG. 12 obtained using both a plate count agar media and a tryptic soy agar media.

In the example shown in FIG. 12 a test was conducted to evaluate the IME kool kount analyzer against the heterotrophic plate count method including both PCA (plate count agar) media and TSA (tryptic soy agar) media. These tests were conducted over a 24 hour period with sampling every 2 hours beginning at 2 hr time point. For the evaluation using PCA, the lag phase lasted approximately 6 hours with logarithmic growth lasting approximately 14 hours starting between about 6 and 7 hours and ending between about 18 and 20 hours. The maximum microbial count utilizing the PCA media was $1e^{10}$. For the evaluation using TSA media, the lag phase lasted approximately 6 hours followed by logarithmic growth lasting approximately 15 hours starting between about 6 and 7 hours and ending between about 18 and hours. The maximum microbial count utilizing the PCA media was $2.2e^{10}$.

These various evaluations of the biogenerator have proven that this system of growing up various strains of bacteria in a liquid or dry formulation give concentrations of microbes that, when released for downstream application, are in densities that enable bioremediation of various industrial wastes.

Figure 13:
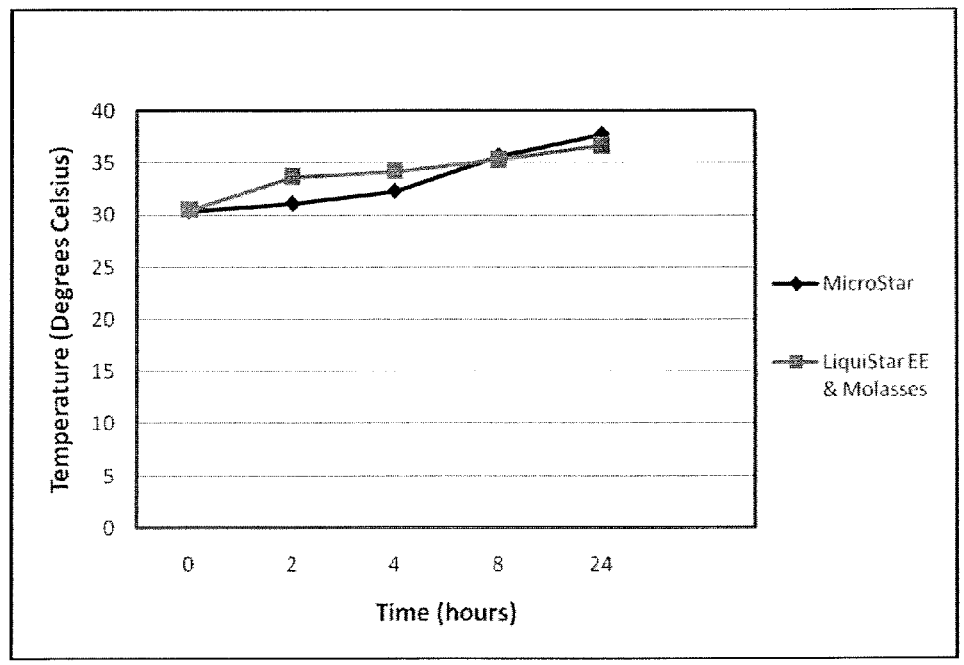
FIG. 13 is a graph indicating temperature and degree Celsius over time in hours for different mixtures of bacteria and nutrients.
Figure 14:
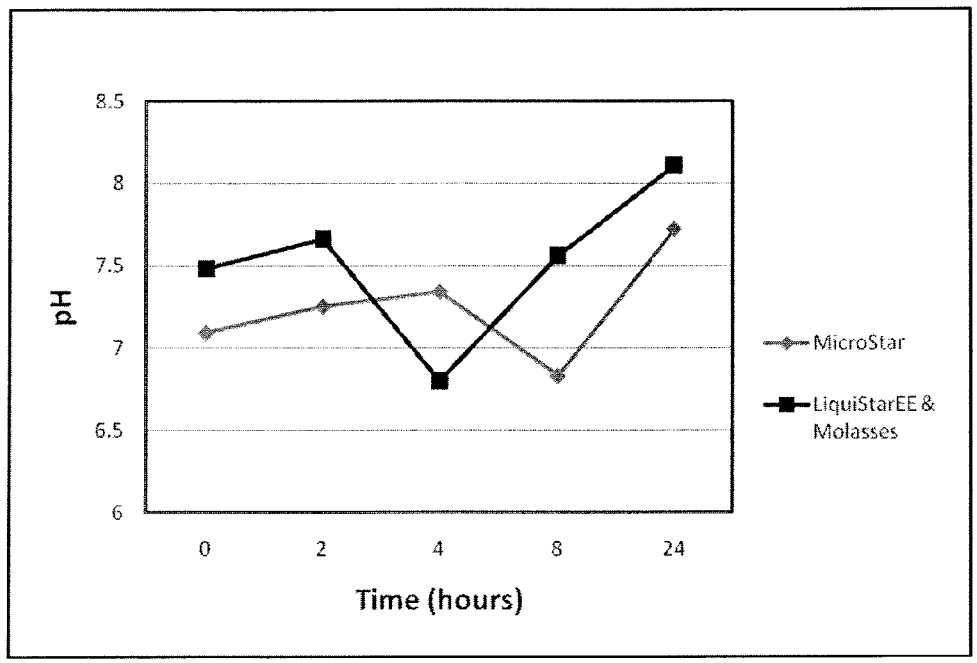
FIG. 14 is a graph indicating ph over time in hours for the chamber for different microorganism and nutrient mixtures.
Figure 15:
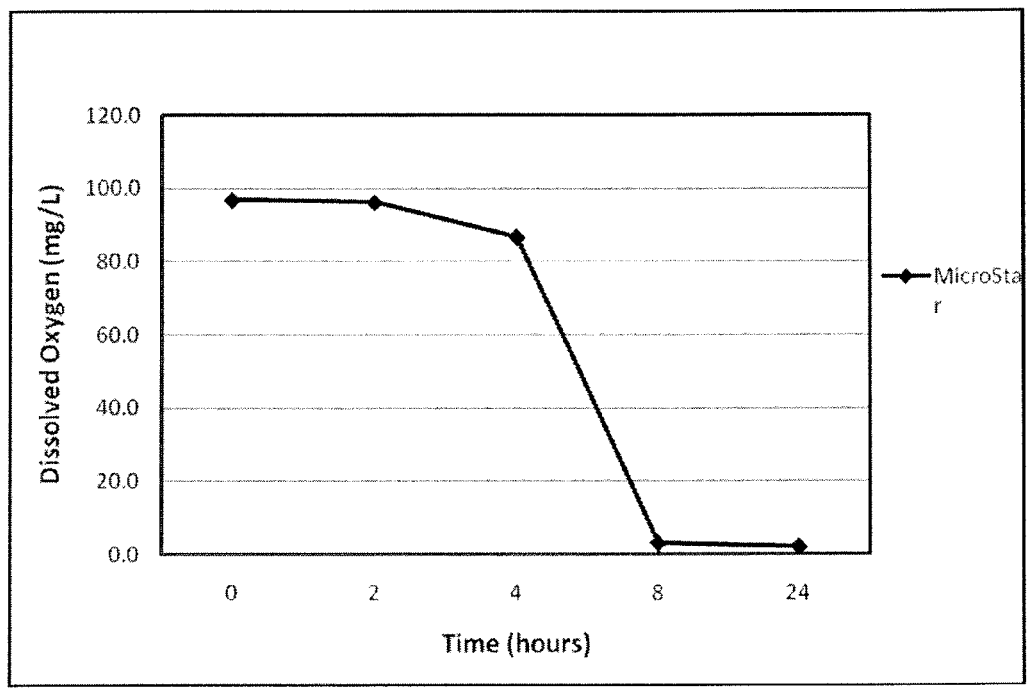
FIG. 15 is a graph indicating dissolved oxygen uptake over time in hours for the chamber part of the preferred embodiment of the apparatus of the present invention wherein the chamber is filled with a nutrient and microorganisms.
Figure 16:
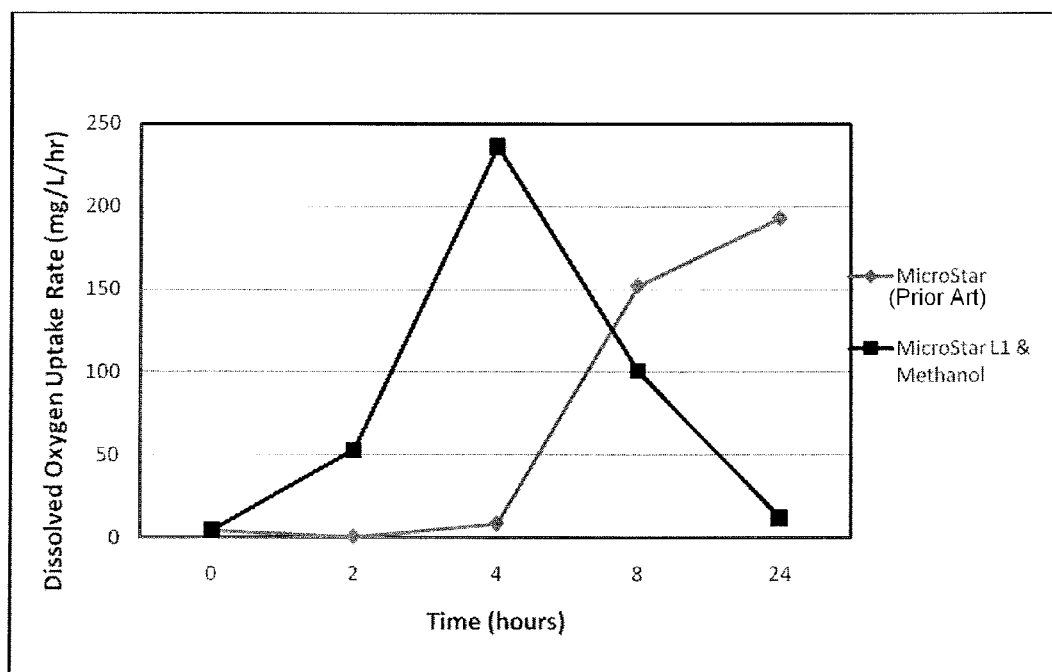
FIG. 16 is a graph indicating dissolved oxygen uptake rate over time in hours for different microorganism and nutrient mixtures.

This system also allows for the effective heat release thus allowing the temperature to stay well within the preferred ranges of the microorganisms implemented (e.g. between about ambient and 40 degrees C.) (see FIG. 13). The pH is also well maintained throughout the exponential growth phase allowing for optimal growth conditions (e.g. pH between about 4 and 9, more particularly between about 6.5 and 8.5) (see FIG. 14). These evaluations also show that the aeration in this design is adequate, as indicated by the Dissolved Oxygen uptake rate (see FIG. 15). The Dissolved Oxygen Uptake Rate during logarithmic growth (between about 50 and 200) is most impressive when compared to the prior art (see FIG. 16). Dissolved oxygen uptake rates are indicative of microbial growth. As the population of microbes increases, so does the Dissolved Oxygen Uptake Rate.

Figure 17:
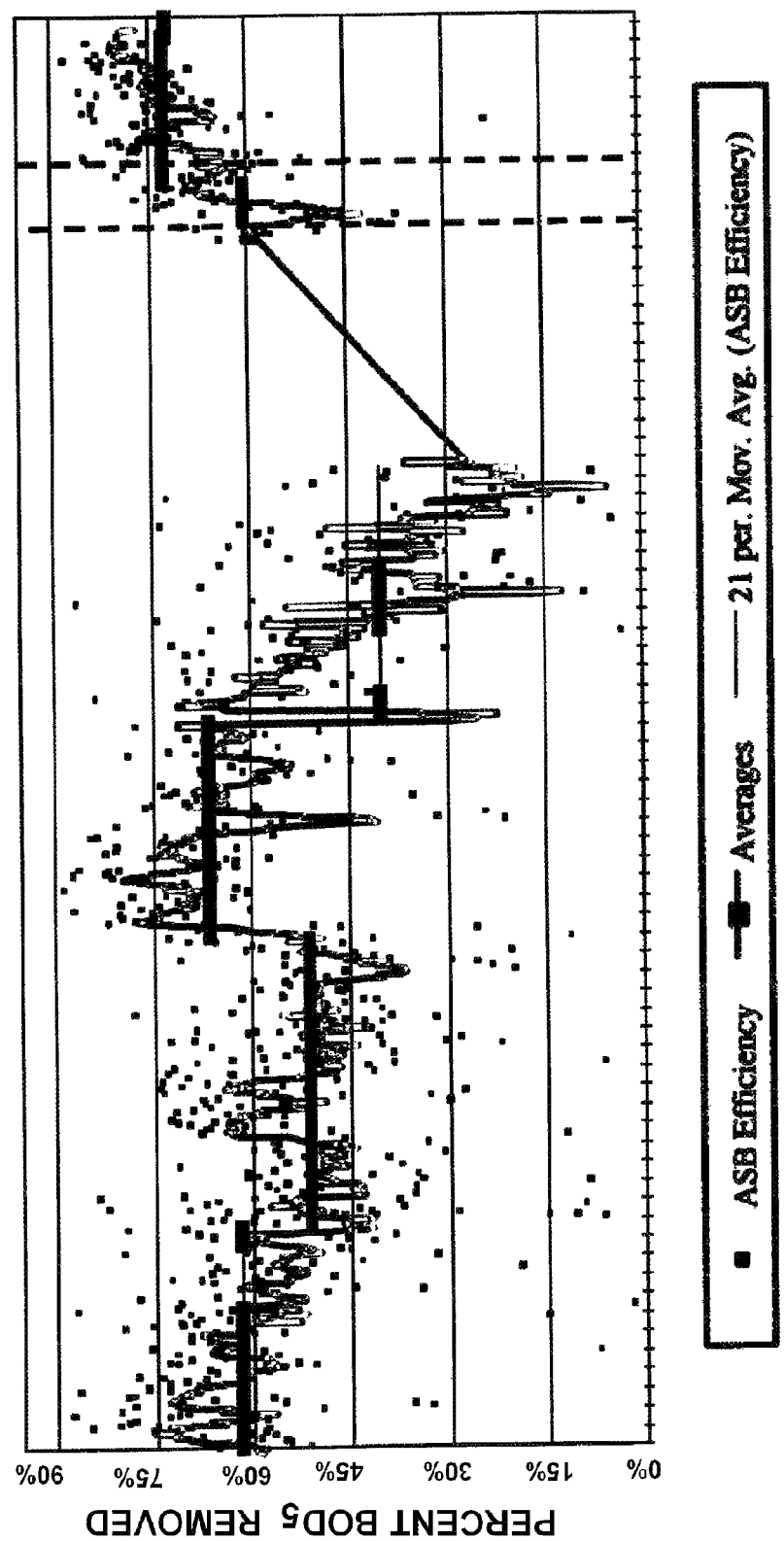
FIG. 17 is a graph indicating a percentage of BOD5 removal over time in months for a paper mill aerated stabilization basin before and after implementation of the method and apparatus of the present invention, with each notch on the x-axis of the table representing about 2 months.
Figure 18:
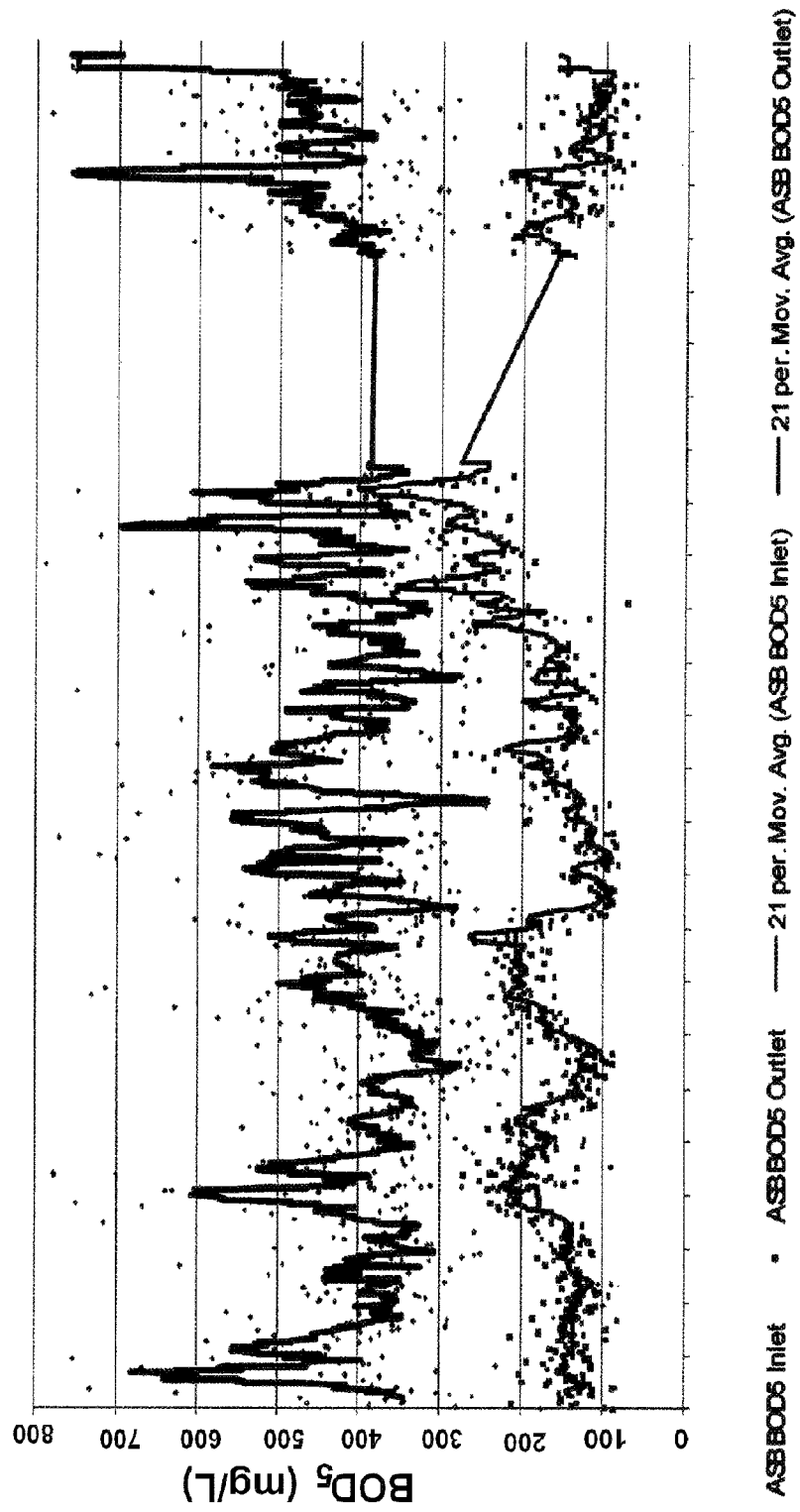
FIG. 18 is a graph indicating BOD5 inlet and BOD5 outlet for an aerated stabilization basin over time in months, with each notch on the x-axis of the table representing about 3 months.
Figure 19:
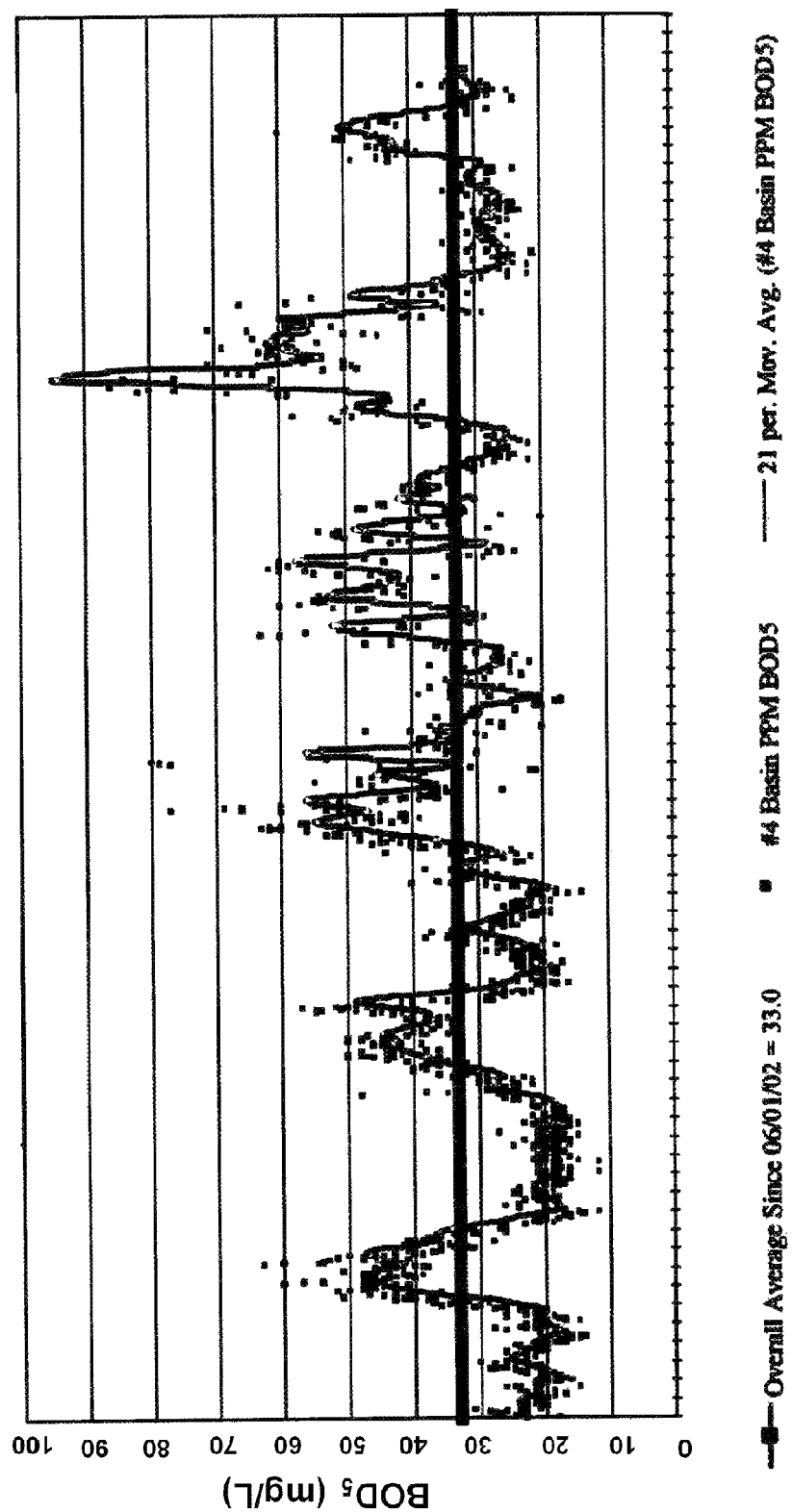
FIG. 19 is a graph illustrating BOD5 over time in months for an aerated stabilization basin, with each notch on the x-axis of the table representing about 2 months.

In the example of FIGS. 17-19, the test data is for an Aerated Stabilization Basin (ASB) that became nonfunctional in 2006-2007 due to excessive solids buildup and inversion of solids. The method and apparatus of the present invention were implemented to maximize and optimize performance of the Aerated Stabilization Basin under current limitations including limited aeration and loss of retention time due to solid buildup. To accelerate biological reduction of solids inventory in the Aerated Stabilization Basis, five (5) pounds per day of bacteria was applied via the apparatus 10 of the present invention as shown and described in FIGS. 1-9. These data depict an increase in the percent of BOD5 removal after implementation of the method and apparatus of the present invention beginning in August, 2007. All solid straight lines depict data gaps.

In FIG. 18, the same Aerated Stabilization Basin as treated by apparatus 10 of the present invention shows BOD5 inlet and BOD5 outlet values. These values demonstrate that there is a significant decrease in the outlet BOD5 when compared to the inlet BOD5.

Figure 21:
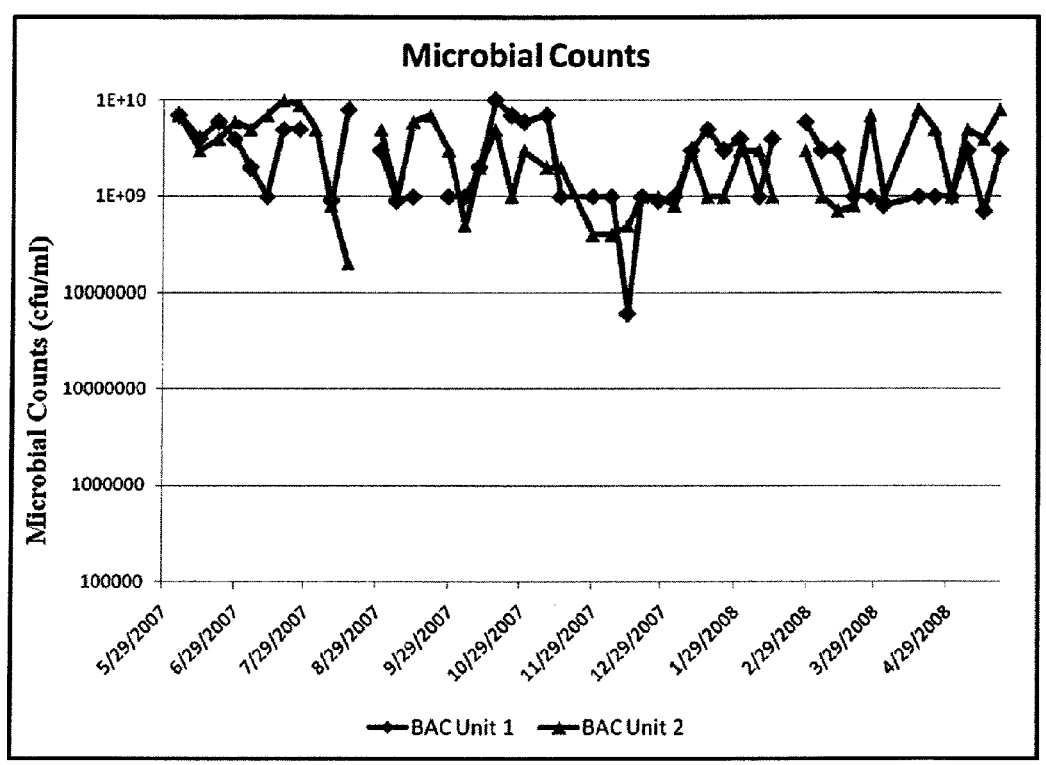
FIG. 21 is a graph indicating bacteria counts over time in months for remediation of a paper mill with an aerated stabilization basin.

FIG. 19 shows final results as respect to final effluent BOD5 for the same Aerated Stabilization Basin that was treated as described with respect to FIGS. 17 and 18. FIG. 19 illustrates stabilization of BOD5 for basin 4. FIG. 21 depicts the microbial counts (cfu/ml) achieved in two bacterial acceleration chambers 11.

Figure 20:
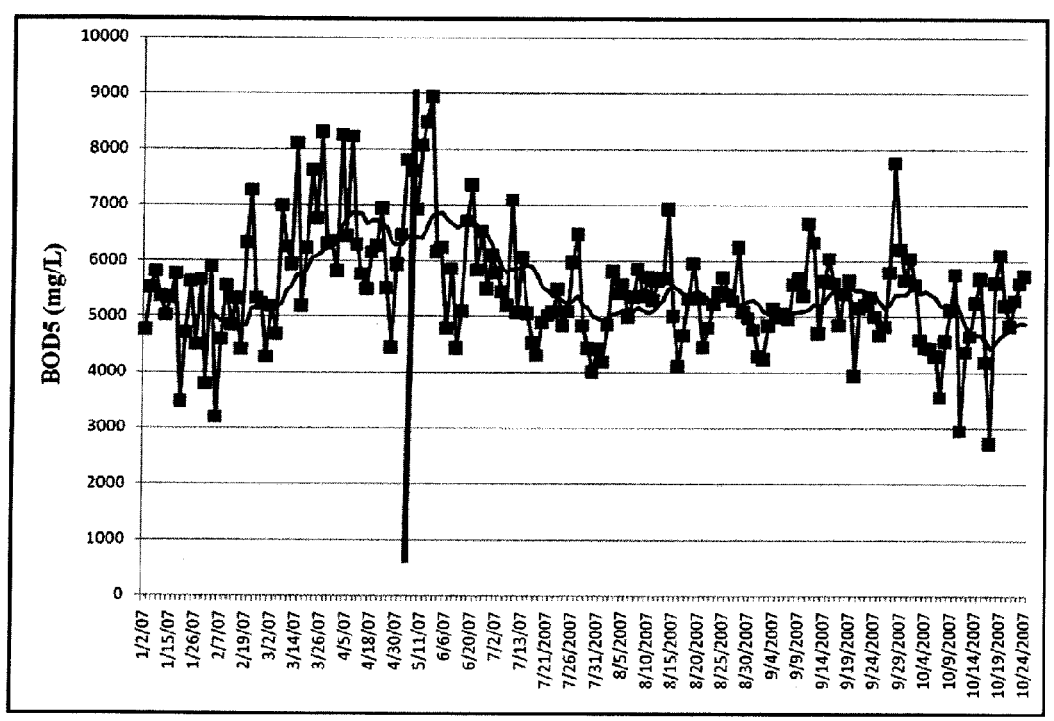
FIG. 20 is a graph indicating Effluent BOD5 in pounds over time in months for a recycled paper mill and illustrating a reduction BOD5 using the method and apparatus of the present invention.
Figure 22:
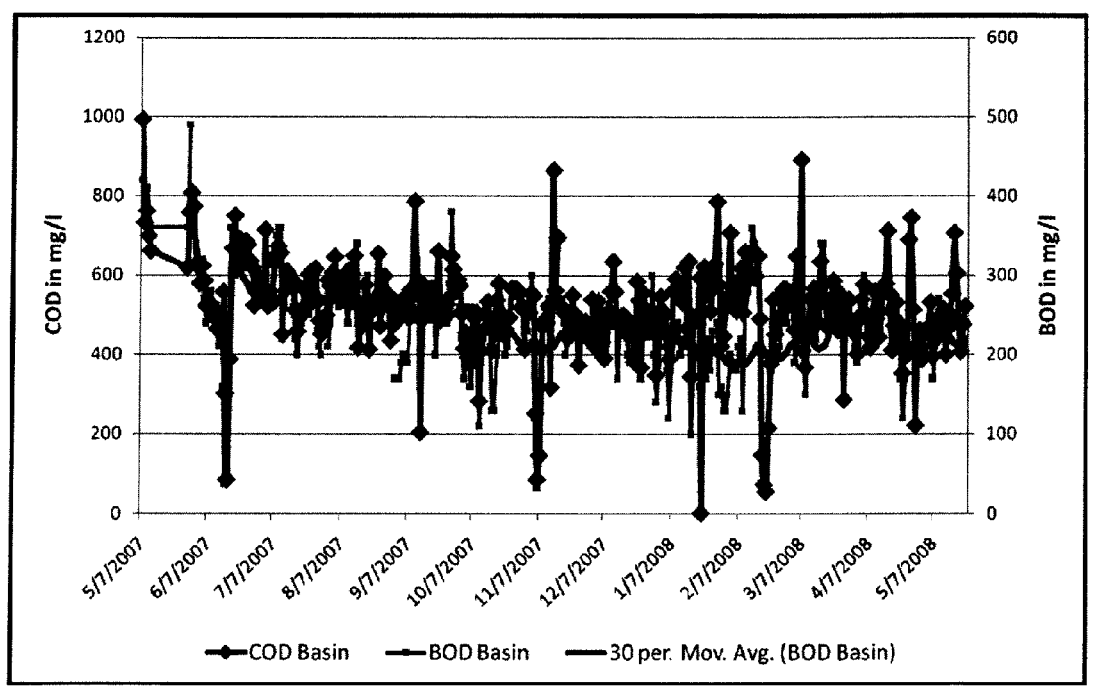
FIG. 22 is a graph indicating COD and BOD5 removal over time in months for remediation of a paper mill with an aerated stabilization basin.

In FIGS. 20-22, test results are directed to the waste treatment and remediation at a recycle paper mill that discharges to the local POTW treatment. This local POTW treatment has been unable to meet BOD5 permanent restrictions. Bioaugmentation was implemented using the method and apparatus of the present invention resulting in compliance with BOD5 permanent restrictions for nine consecutive months. FIG. 22 illustrates removal of both BOD5 and COD from the wastewater basin.

Figure 23:
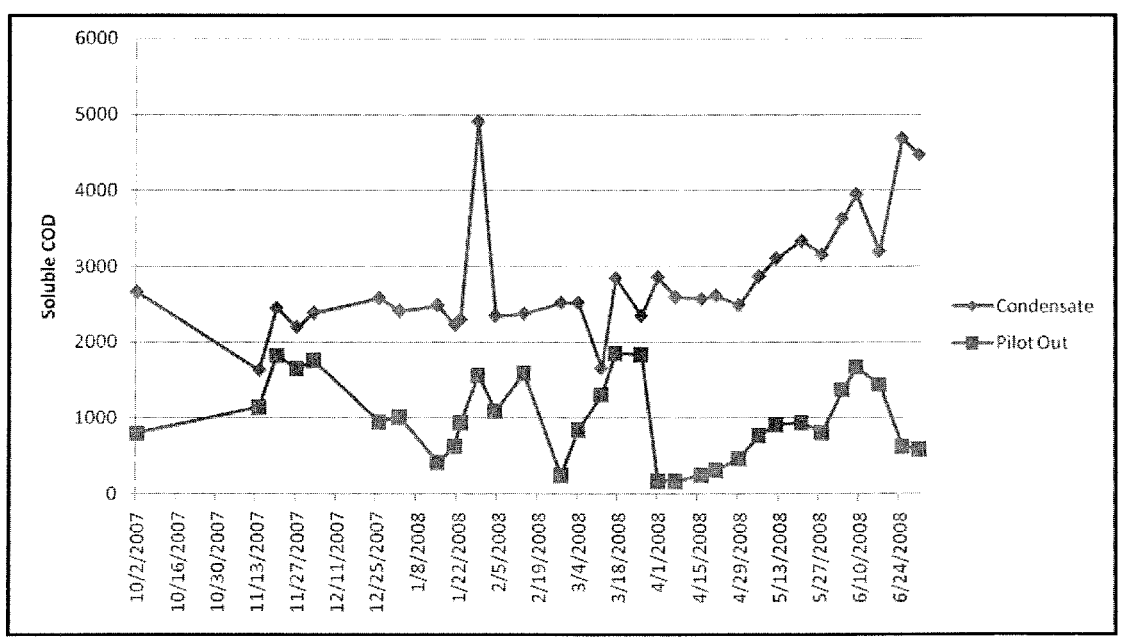
FIG. 23 is a graph indicating soluble COD over time in months for the method and apparatus of the present invention applied to a paper product waste stream.

FIG. 23 is a case study for a paper products/chemical company that provides products to the paper industry. The method and apparatus of the present invention were added to the treatment system in place on or about October, 2007 date. The apparatus 10 of the present invention was effective in growing bacteria to maximum yield, enabling a reduction in COD and BOD5.

Figure 24:
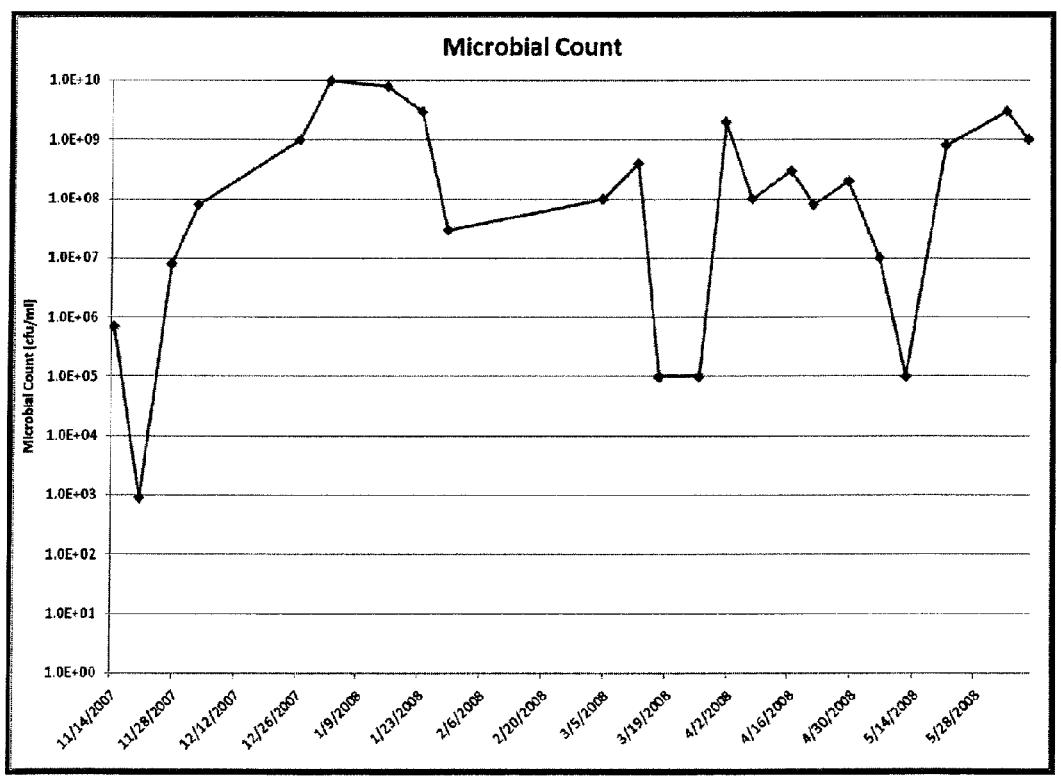
FIG. 24 is a graph indicating microbial count over time for the paper product waste system of FIG. 23.
Figure 25:
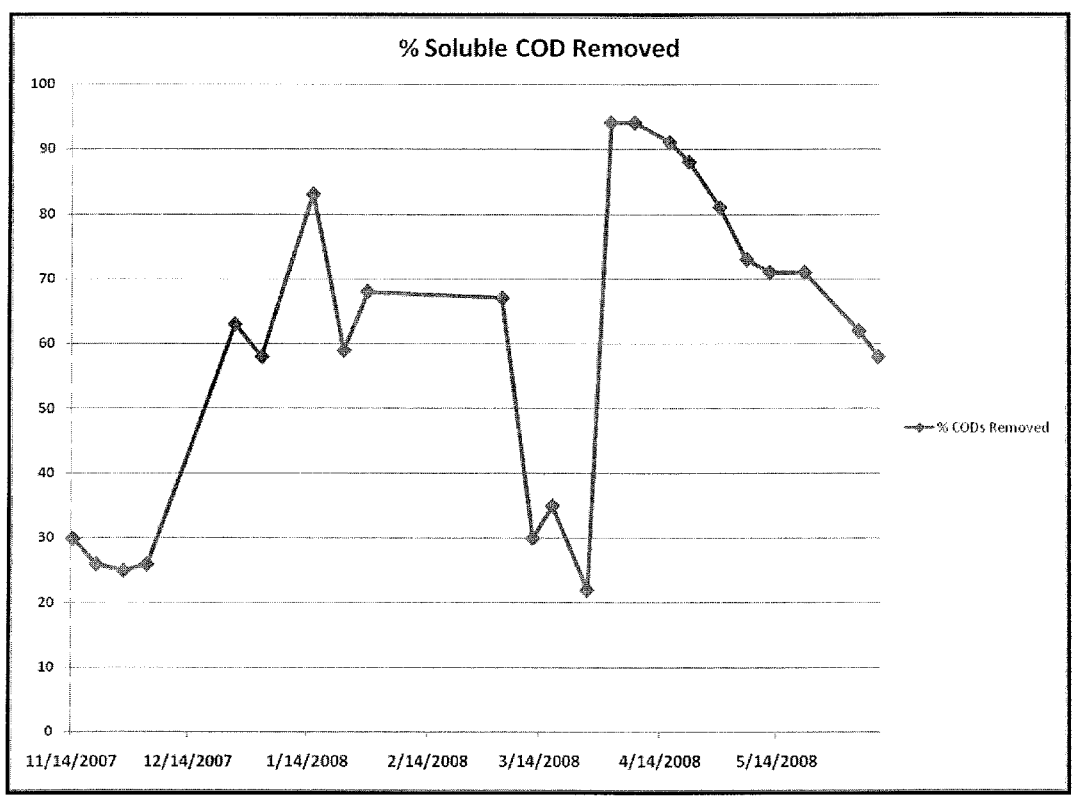
FIG. 25 is a graph indicating percent soluble COD removed over time for paper product waste stream of FIG. 23.

FIG. 24 illustrates the microbial count (cfu/ml) achieved. FIG. 25 illustrates the percent COD removal from the wastewater basin.

The following is a list of parts and materials suitable for use in the present invention.

| PARTS LIST | |
|---|---|
| Part Number | Description |
| 10 | waste treatment apparatus |
| 11 | growth chamber |
| 12 | upper end portion |
| 13 | lower end portion |
| 14 | top |
| 15 | opening |
| 16 | cylindrical section |
| 17 | conical section |
| 18 | side wall |
| 19 | inside surface |
| 20 | interior |
| 21 | outlet port |
| 22 | discharge piping |
| 23 | pump |
| 24 | filter |
| 25 | base |
| 26 | leg |
| 27 | cover |
| 28 | fluid level/water level |
| 29 | water supply |
| 30 | valve |
| 31 | flow line |
| 32 | discharge fitting |
| 33 | inlet opening |
| 34 | pump discharge flow line |
| 35 | check valve |
| 36 | tee fitting |
| 37 | riser |
| 38 | influent fitting |
| 39 | pipe section |
| 40 | tee fitting |
| 41 | arrow |
| 42 | arrow |
| 43 | arrow |
| 45 | wastewater reservoir |
| 46 | flow line |
| 47 | valve |
| 48 | discharge |
| 49 | arrow |
| 50 | mixture |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A method of wastewater remediation of a volume of wastewater stored in a reservoir, comprising the steps of:
   a) providing a vessel having an interior holding a volume of nutrient liquid medium;
   b) adding a volume of bacteria to the nutrient liquid medium;
   c) providing a fluid transfer system that is in fluid communication with the vessel, the transfer system including an influent flow line and an effluent flow line;
   d) for a first time interval, recirculating the combination of nutrient liquid medium and bacteria through a selected flow path;
   e) after the first time interval, transmitting a volume of the combination of nutrient liquid medium and bacteria to the reservoir; and
   f) wherein in step "d" the bacteria concentration increases to a concentration of between about $1.0 \times 10^7$ to $1.0 \times 10^{10}$ cfu (colony forming units) per milliliter (ml).

2. The method of claim 1 wherein the ratio of the volume of the reservoir to the average influent flow rate to the vessel is between about 100,000-10,000,000 gallons to 1.

3. The method of claim 1 wherein the ratio of the volume of the reservoir to the volume of the vessel is between about 100,000 and 1,000,000 to 1.

4. The method of claim 1 wherein the fluid transfer system includes a vent port for aeration and further comprising aerating the nutrient liquid medium in step "d".

5. The method of claim 1 wherein steps "b", "c" and "e" are repeated for the same remediation of the reservoir within a time period of between about 12 to 72 hours.

6. The method of claim 1 wherein the nutrient liquid medium includes concentrations of phosphorus and nitrogen to sustain bacterial cell division and microbial growth.

7. The method of claim 1 wherein the bacteria include strains of aerobic species of the genera *Bacillus* and *Pseudomonas*.

8. The method of claim 1 wherein in step "a" the nutrient liquid medium includes water, methanol and a nutrient.

9. The method of claim 1 wherein in step "a" the nutrient liquid medium includes water and methanol.

10. The method of claim 1 wherein in step "d" the recirculating is at a flow rate of between about 50 and 90 gallons per minute.

11. The method of claim 1 wherein in step "d" the recirculating is at a flow rate of between about 55 to 88 gallons per minute.

12. The method of claim 1 wherein in step "d" dissolved oxygen in the nutrient liquid medium is between about 0.5 mg/L and 100 mg/L.

13. The method of claim 1 wherein in step "d" the dissolved oxygen uptake rate is between about 50 and 1500 mg/L/hr.

14. The method of claim 1 wherein in step "d" the recirculating is at a flow rate that does not substantially damage cells.

15. The method of claim 1 wherein the vessel has a volume of between about 25 and 500 gallons.

16. The method of claim 1 wherein the vessel has a cylindrically shaped section.

17. The method of claim 1 wherein the vessel has a conically shaped section.

18. The method of claim 1 wherein the first time interval is between about four and twenty-four hours.

19. The method of claim 1 wherein the critical cell mass concentration is more than $1.0 \times 10^7$ per milliliter.

20. The method of claim 1 wherein the critical cell mass concentration is more than $1.0 \times 10^8$ per milliliter.

21. The method of claim 6, wherein the concentration of phosphorus is between about 0.5 mg/L and 10 mg/L.

22. The method of claim 21, wherein the concentration of phosphorus is usually between about 1.0 mg/L and 5 mg/L.

23. The method of claim 6, wherein the nitrogen concentration is between about 0.5 mg/L and 25 mg/L.

24. The method of claim 23, wherein the nitrogen concentration is typically between about 2.5 mg/L to 15 mg/L.

* * * * *

(12) EX PARTE REEXAMINATION CERTIFICATE (41st)
Ex Parte Reexamination Ordered under 35 U.S.C. 257

United States Patent
Foster et al.

(10) Number: US 8,486,266 C1
(45) Certificate Issued: *Nov. 13, 2015

(54) BACTERIAL CULTIVATION SYSTEM FOR GROWTH OF SUBSTRATE SPECIFIC MICRO-ORGANISMS FOR USE IN INDUSTRIAL WASTEWATER REMEDIATION

(71) Applicant: Environmental Business Specialists, LLC, Mandeville, LA (US)

(72) Inventors: Michael Harvey Foster, Mandeville, LA (US); Kenneth Wayne Smith, Natchez, MS (US); Bronwyn Duos, Hammond, LA (US); Elizabeth Claire Guidotti, Mandeville, LA (US)

(73) Assignee: ENVIRONMENTAL BUSINESS SPECIALISTS, LLC, Mandeville, LA (US)

Supplemental Examination Request:
No. 96/000,081, Nov. 18, 2014

Reexamination Certificate for:
Patent No.: 8,486,266
Issued: Jul. 16, 2013
Appl. No.: 13/646,150
Filed: Oct. 5, 2012

( * ) Notice: This patent is subject to a terminal disclaimer.

Related U.S. Application Data

(63) Continuation of application No. 13/291,831, filed on Nov. 8, 2011, now Pat. No. 8,282,826, which is a continuation of application No. 12/261,883, filed on Oct. 30, 2008, now Pat. No. 8,052,873.

(60) Provisional application No. 60/984,228, filed on Oct. 31, 2007.

(51) Int. Cl.
*C02F 3/34* (2006.01)

(52) U.S. Cl.
CPC ............. *C02F 3/348* (2013.01); *C02F 2305/06* (2013.01)

(58) Field of Classification Search
None
See application file for complete search history.

(56) References Cited

To view the complete listing of prior art documents cited during the supplemental examination proceeding and the resulting reexamination proceeding for Control Number 96/000,081, please refer to the USPTO's public Patent Application Information Retrieval (PAIR) system under the Display References tab.

*Primary Examiner* — Krisanne Jastrzab

(57) ABSTRACT

A waste treatment method includes the concentration of selected strains of bacteria in a selected medium in the presence of nutrients and water, under aerobic conditions. This concentrated batch is discharged for downstream applications in wastewater remediation. A cultivation chamber having inlet ports and a circular vent port allows for adequate air introduction and heat release. Aeration is achieved by recirculation of the fluid medium from the top of the apparatus through a pipe that runs the length of the inner wall and is specially configured at the top to minimize cell damage. Fluid can be routed tangentially in clockwise and counterclockwise directions. The conical bottom has an orifice allowing for recirculation of the fluid medium tangentially to the sidewalls. Upon completion of batch cultivation, the medium and bacteria are discharged for downstream applications in wastewater remediation of paper mill, chemical plant, oil refinery, and other industrial effluents.

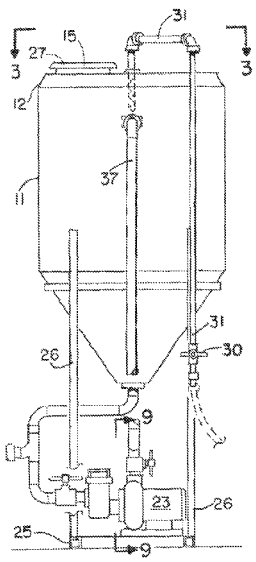

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-7, 10-18 and 21-24 are cancelled.

Claims 8-9 and 19-20 are determined to be patentable as amended.

8. [The method of claim 1] *A method of wastewater remediation of a volume of wastewater stored in a reservoir, comprising the steps of:*
- *a) providing a vessel having an interior holding a volume of nutrient liquid medium;*
- *b) adding a volume of bacteria to the nutrient liquid medium;*
- *c) providing a fluid transfer system that is in fluid communication with the vessel, the transfer system including an influent flow line and an effluent flow line;*
- *d) for a first time interval, recirculating the combination of nutrient liquid medium and bacteria through a selected flow path;*
- *e) after the first time interval, transmitting a volume of the combination of nutrient liquid medium and bacteria to the reservoir; and*
- *f) wherein in step "d" the bacteria concentration increases to a concentration of between about $1.0\times10^7$ to $1.0\times10^{10}$ cfu (colony forming units) per milliliter (ml), and wherein in step "a" the nutrient liquid medium includes, water, methanol and a nutrient.*

9. [The method of claim 1] *A method of wastewater remediation of a volume of wastewater stored in a reservoir, comprising the steps of:*
- *a) providing a vessel having an interior holding a volume of nutrient liquid medium;*
- *b) adding a volume of bacteria to the nutrient liquid medium;*
- *c) providing a fluid transfer system that is in fluid communication with the vessel, the transfer system including an influent flow line and an effluent flow line;*
- *d) for a first time interval, recirculating the combination of nutrient liquid medium and bacteria through a selected flow path;*
- *e) after the first time interval, transmitting a volume of the combination of nutrient liquid medium and bacteria to the reservoir; and*
- *f)* [The method of claim 1] wherein in step "a" the nutrient liquid medium includes water and methanol, *and wherein in step "d" the bacteria concentration increases to a concentration of between about $1.0\times10^{10}$ to $1.0\times10^{12}$ cfu (colony forming units) per milliliter (ml)*.

19. The method of claim [1] *8* wherein [the] *a* critical cell mass concentration *of the bacteria concentration* is more than $1.0\times10^7$ per milliliter.

20. The method of claim [1] *8* wherein [the] *a* critical cell mass concentration *of the bacteria concentration* is more than $1.0\times10^8$ per milliliter.

* * * * *